United States Patent
Roberts et al.

(10) Patent No.: US 11,618,140 B2
(45) Date of Patent: Apr. 4, 2023

(54) TOOL FOR SECURING A CLAMP

(71) Applicant: Oetiker Tool Corporation, Branford, CT (US)

(72) Inventors: Jeremy Roberts, Guilford, CT (US); Joseph Krzyzanski, New Haven, CT (US); Charlie Gargano, Guilford, CT (US); Scott Wetzel, Milford, CT (US); Richard Steiner, East Haddam, CT (US)

(73) Assignee: Oetiker Tool Corporation, Branford, CT (US)

( * ) Notice: Subject to any disclaimer, the term of this patent is extended or adjusted under 35 U.S.C. 154(b) by 920 days.

(21) Appl. No.: 16/469,947

(22) PCT Filed: Jan. 3, 2018

(86) PCT No.: PCT/US2018/012141
§ 371 (c)(1),
(2) Date: Jun. 14, 2019

(87) PCT Pub. No.: WO2018/132281
PCT Pub. Date: Jul. 19, 2018

(65) Prior Publication Data
US 2020/0078912 A1    Mar. 12, 2020

Related U.S. Application Data
(60) Provisional application No. 62/445,356, filed on Jan. 12, 2017.

(51) Int. Cl.
*B25B 25/00* (2006.01)
*B25B 7/02* (2006.01)
(Continued)

(52) U.S. Cl.
CPC .............. *B25B 25/00* (2013.01); *B25B 7/02* (2013.01); *B25B 7/12* (2013.01); *B65B 13/027* (2013.01)

(58) Field of Classification Search
CPC .. B25B 25/00; B25B 7/12; B25B 7/02; B65B 13/027; B65B 13/345; B65B 61/06; B65B 59/04; B65B 13/185; B65B 13/22
See application file for complete search history.

(56) References Cited

U.S. PATENT DOCUMENTS
4,548,242 A * 10/1985 Paradis ................ F16L 3/12
140/93.2
4,953,384 A    9/1990 Baillet et al.
(Continued)

FOREIGN PATENT DOCUMENTS
| CN | 1715000 A | 1/2006 |
|---|---|---|
| CN | 101659041 A | 3/2010 |
| WO | 1997013092 A1 | 4/1997 |

OTHER PUBLICATIONS
International Search Report and Written Opinion for International Application No. PCT/US2018/012141 dated Mar. 20, 2018; 11 pgs.
(Continued)

*Primary Examiner* — Seahee Hong
(74) *Attorney, Agent, or Firm* — McCarter & English, LLP; Dave S. Christensen

(57) ABSTRACT

A tool for securing a clamp having a band and a clip is provided. The tool includes a base member and a first handle coupled to the base member. A cinching handle is rotationally coupled to the base member adjacent the first handle. A crimping handle is rotationally coupled to the base member adjacent the first handle opposite the cinching handle. A holding means is provided for holding the clip. A tensioning means is provided for moving a tab end portion of the band through the clip, the tensioning means being operably
(Continued)

coupled to the cinching handle. A crimping means is provided for locking the clip to the band, the crimping means being operably coupled to the crimping handle. A severing means is provided for severing the tab end portion from the band, the severing means being operably coupled to the crimping handle.

19 Claims, 15 Drawing Sheets

(51) Int. Cl.
    *B25B 7/12*     (2006.01)
    *B65B 13/02*     (2006.01)

(56) References Cited

U.S. PATENT DOCUMENTS

| | | | | |
|---|---|---|---|---|
| 5,921,290 | A * | 7/1999 | Dyer | B65B 13/027 |
| | | | | 140/93.2 |
| 6,206,053 | B1 * | 3/2001 | Hillegonds | B65B 13/027 |
| | | | | 140/93.2 |
| 8,312,755 | B1 | 11/2012 | Steiner et al. | |
| 2007/0289353 | A1 | 12/2007 | Fiorisi | |
| 2009/0120245 | A1 | 5/2009 | Zhang | |
| 2011/0030145 | A1 | 2/2011 | Mandic | |
| 2012/0197256 | A1 * | 8/2012 | Knueppel | A61B 17/8863 |
| | | | | 606/74 |
| 2015/0151862 | A1 * | 6/2015 | Kitago | B65B 13/305 |
| | | | | 140/93.2 |
| 2015/0336694 | A1 * | 11/2015 | Skonieczny, Jr. | B65B 13/185 |
| | | | | 100/2 |
| 2015/0372436 | A1 | 12/2015 | Chou | |

OTHER PUBLICATIONS

Chinese Office Action for Application No. 2018800051758 dated May 20, 2020; 6 pgs.

* cited by examiner

TOOL FOR SECURING A CLAMP

BACKGROUND OF THE DISCLOSURE

The subject matter disclosed herein relates to a hand tool for securing a clamp, such as a band-type clamp. In particular, the subject matter disclosed herein relates to a hand tool for tightening, crimping and cutting a clamp during installation with a single tool.

Clamps are used in a wide variety of applications for securing conduits to fittings. One type of clamp, includes a cylindrically shaped strip of material having overlapping ends. By moving one end of the strip, the diameter of the clamp may be changed. When the clamp is placed over a conduit, the reduction of the diameter secures the conduit onto a fitting. One type of band clamp uses a worm drive mechanism, which allows the installer to turn the worm drive (typically with a screwdriver) to adjust the diameter of the clamp. It should be appreciated that the installer may adjust the amount of clamping pressure that is applied by adjusting the position of the worm drive.

Another type of band clamp uses a clip to secure and lock the band in place. This type of clamp usually requires the clip to be crimped with one tool and trimmed or cut with a second tool. In some cases, a third tool is used for tightening or cinching prior to the crimping step.

Accordingly, while existing tools for tightening and securing band clamps are suitable for their intended purpose the need for improvement remains, particularly in providing a tool that that allows a clip type band clamp to be installed with a single tool.

BRIEF DESCRIPTION OF THE DISCLOSURE

According to one aspect of the disclosure, a tool for securing a clamp having a band and a clip is provided where a portion of the band extends through the clip. The tool includes a base member and a first handle coupled to the base member. A cinching handle is rotationally coupled to the base member adjacent the first handle. A crimping handle is rotationally coupled to the base member adjacent the first handle opposite the cinching handle. A holding means is provided for holding the clip. A tensioning means is provided for moving a tab end portion of the band through the clip, the tensioning means being operably coupled to the cinching handle. A crimping means is provided for locking the clip to the band, the crimping means being operably coupled to the crimping handle. A severing means is provided for severing the tab end portion from the band, the severing means being operably coupled to the crimping handle.

According to another aspect of the disclosure a tool is provided. The tool including a base member having a first slot and a second slot, the second slot being perpendicular to the first slot and being sized and shaped to receive a clip from a band clamp. A first handle is coupled to the base member. A cinching handle is rotationally coupled to the base member adjacent the first handle. A crimping handle is rotationally coupled to the base member adjacent the first handle opposite the cinching handle. A tensioning member is slidably coupled to the base member and coupled to the cinching handle by a link. At least one pawl is rotationally coupled to the tensioning member, the at least one pawl cooperating with a surface of the tensioning member to engage a tab end portion of a band of the band clamp. A cam member is slidably disposed in the first slot and operably coupled to the crimping handle, the cam member having a pair of opposing cam surfaces arranged on an angle to the first slot. A pair of arms are rotationally coupled to the base member, each of the pair of arms having a jaw portion at one end. A pair of bearings are each coupled to one of the pair of arms on an end opposite the jaw portion, the pair of bearings each being arranged to engage one of the pair of opposing cam surface to rotate the pair of arms from a first position to a second position as the crimping handle is moved from a neutral position to a crimped position. A cutting member is slidably disposed in the first slot, the cutting member being selectively coupled to the cam member based on a position of the crimping handle.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present invention provide advantages in the securing of clamps, such as band clamps. Embodiments of the present invention provide further advantages in allowing the band clamp to be cinched, crimped and cut with a single tool.

Figure 11:
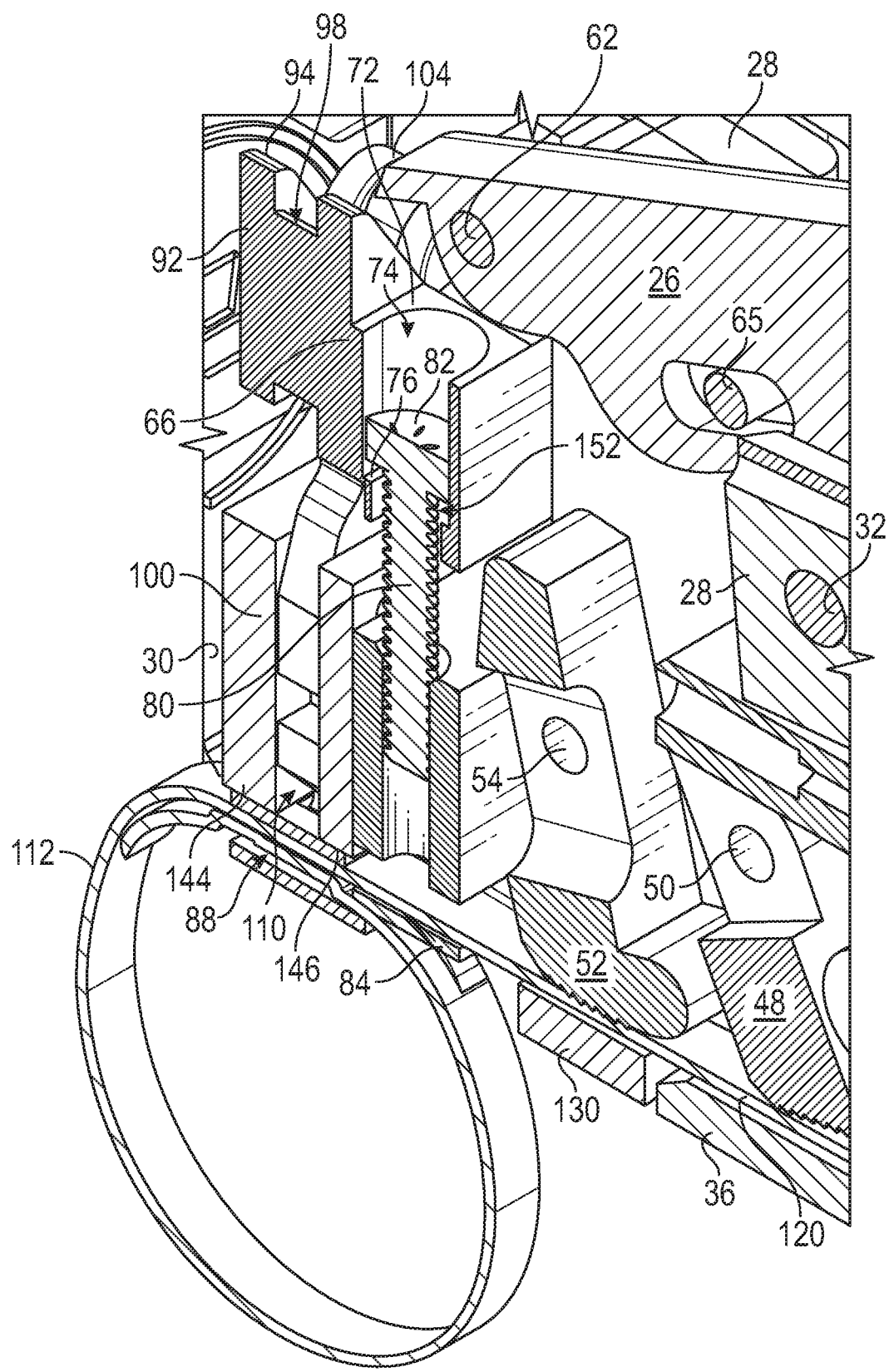
FIG. 11 is a partial perspective sectional view of the tool of FIG. 9 with the tool in the crimping position.
Figure 12:
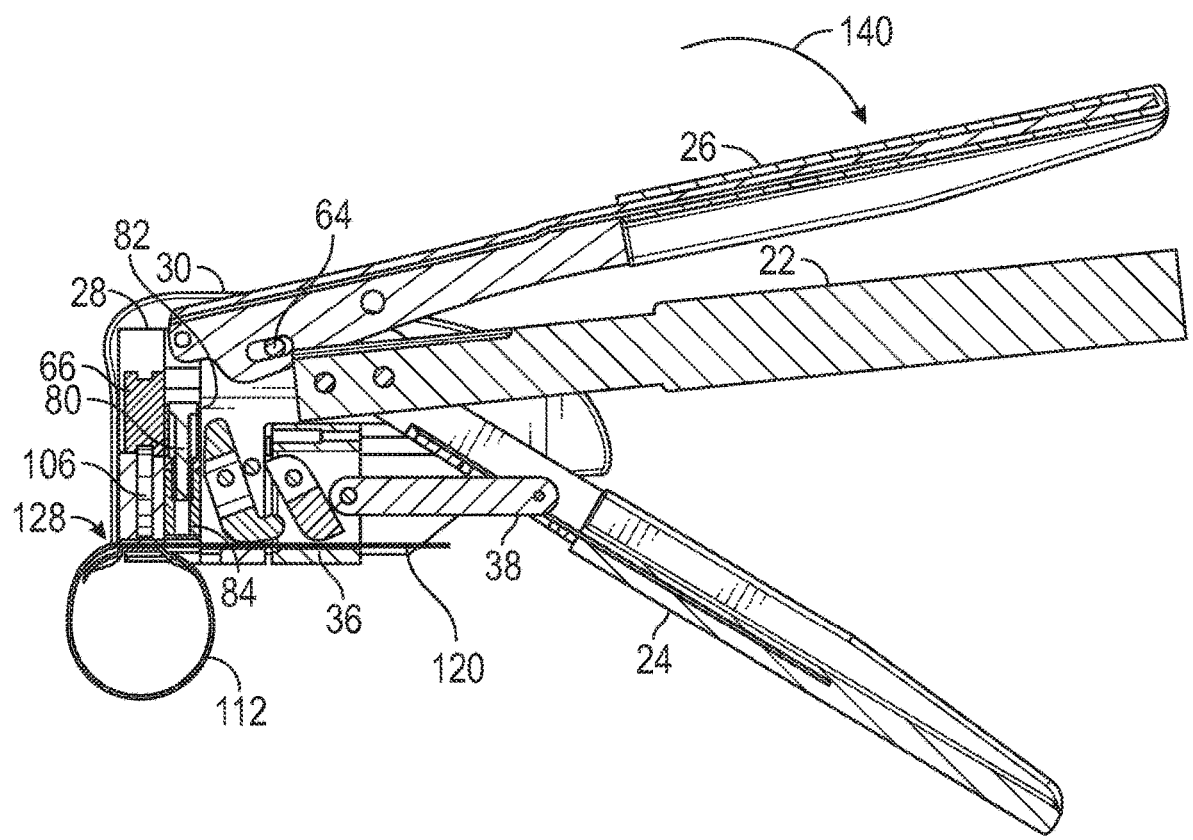
FIG. 12 is a side sectional view of the tool of FIG. 1 with the tool in the cutting position and with the band clamp engaged.
Figure 13:
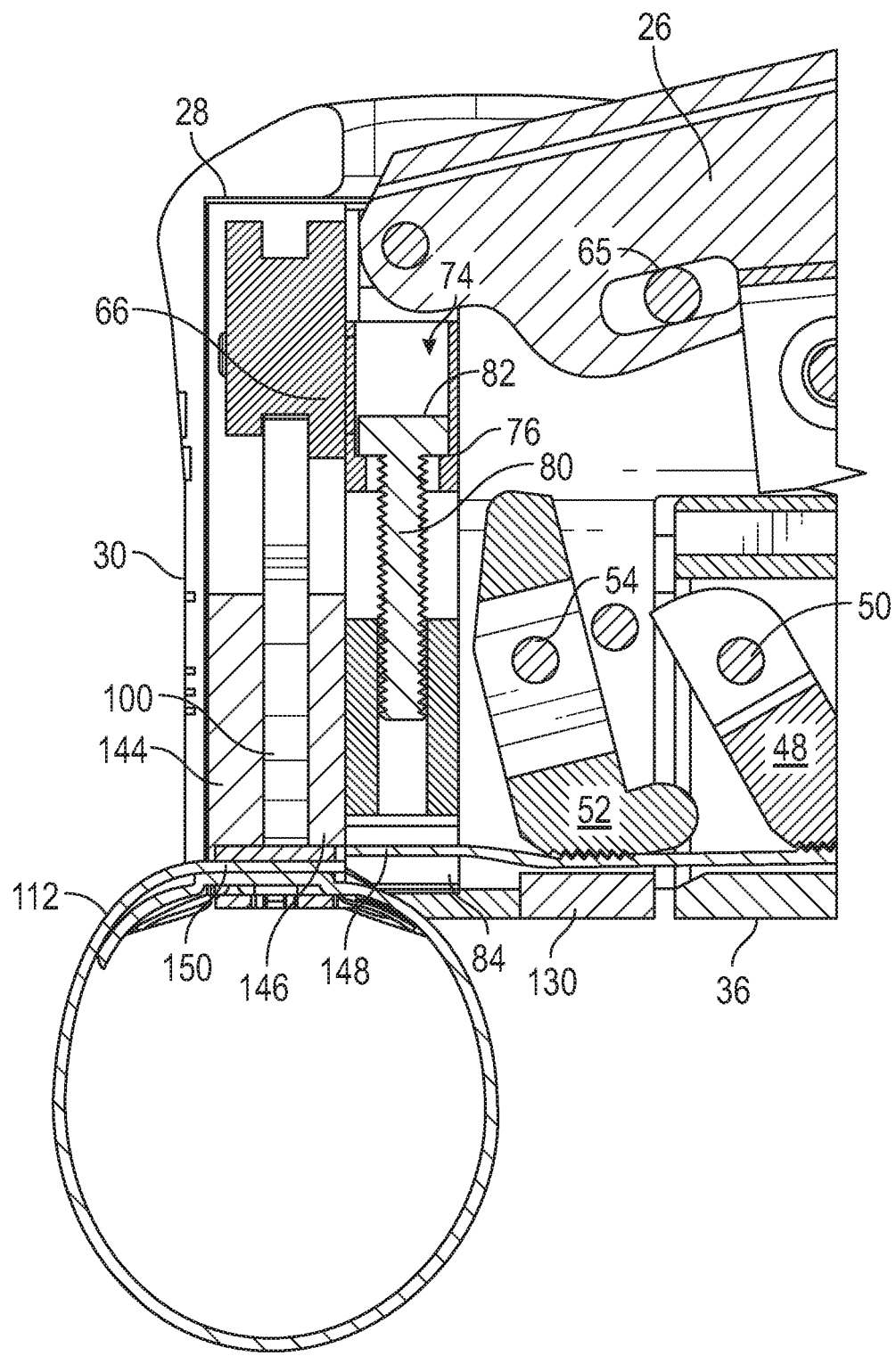
FIG. 13 is a partial side sectional view of the tool of FIG. 12 with the tool in the cutting operation.
Figure 14:
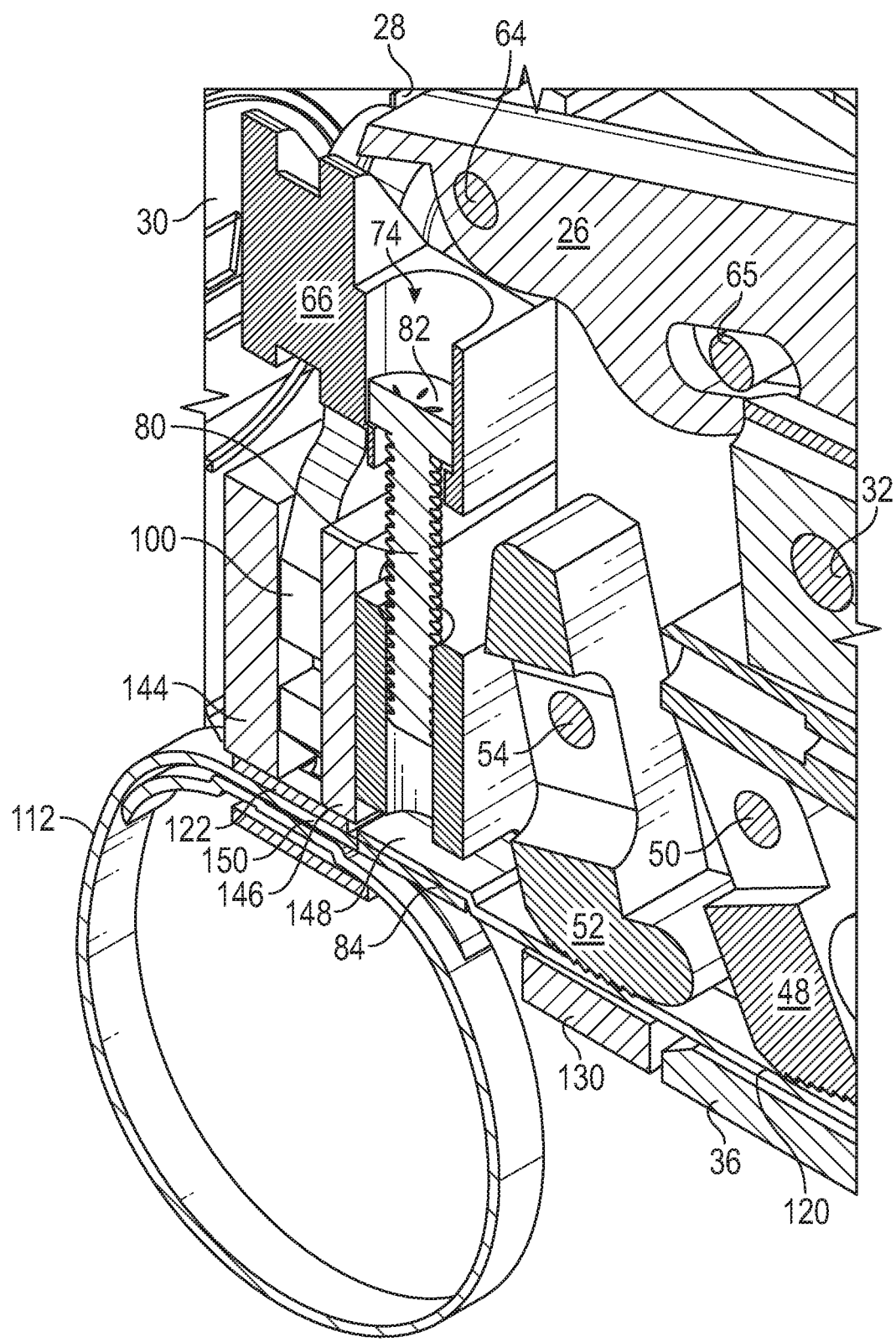
FIG. 14 is a partial perspective sectional view of the tool of FIG. 12 with the tool in a released position.

Referring now to the FIGS. 1-5, an embodiment is shown of a tool 20 for securing clamps, such as band clamps for example. The tool 20 includes a main handle 22, a cinching handle 24 and a crimping/cutting handle 26. The handles 22, 24, 26 are sized, shaped and spaced to be grasped by a user's hand or hands during operation. As will be discussed in more detail herein, the tool 20 includes four modes of operation: a neutral or release position (FIGS. 1-6), a cinching position/operation (FIGS. 7-8), a crimping position/operation (FIGS. 9-11), and a cutting position/operation (FIGS. 12-14).

The handles 22, 24, 26 are coupled to a frame or base member 28 that is enclosed within a cover 30. The cover 30 includes slots or openings to allow the handles 22, 24, 26 to pass therethrough and move during operation. In the exemplary embodiment, the main handle 22 is fixed relative to the base member 28 by a pair of pins 32, 34. The cinching handle 24 is pivotally coupled to the base member 28 by the pin 34. Thus, during the cinching operation, the operator squeezes the handles 22, 24 causing the cinching handle 24 to rotate about the pin 34.

Figure 7:
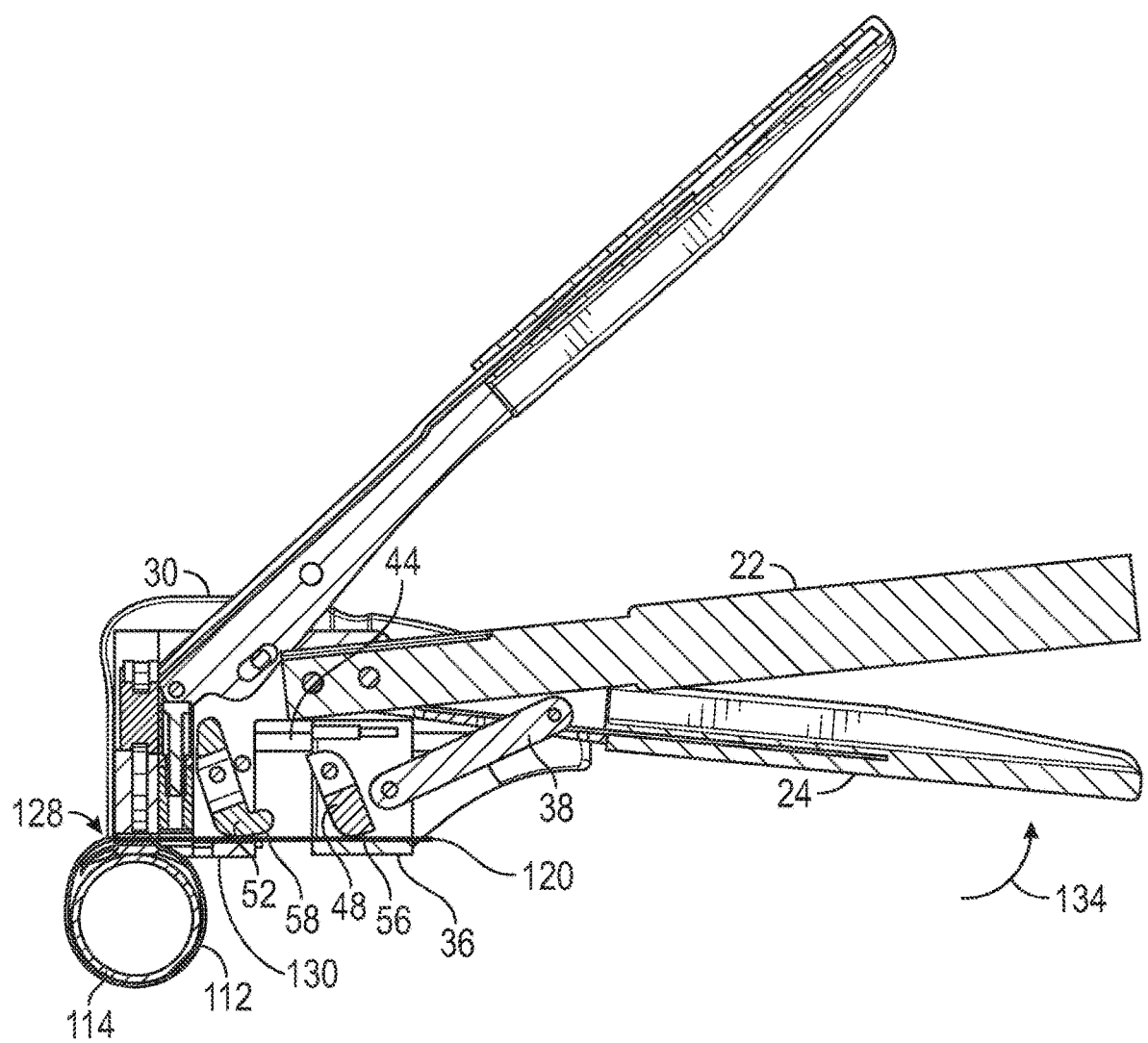
FIG. 7 is a side sectional view of the tool of FIG. 1 in a cinching position with a band clamp engaged.
Figure 15:
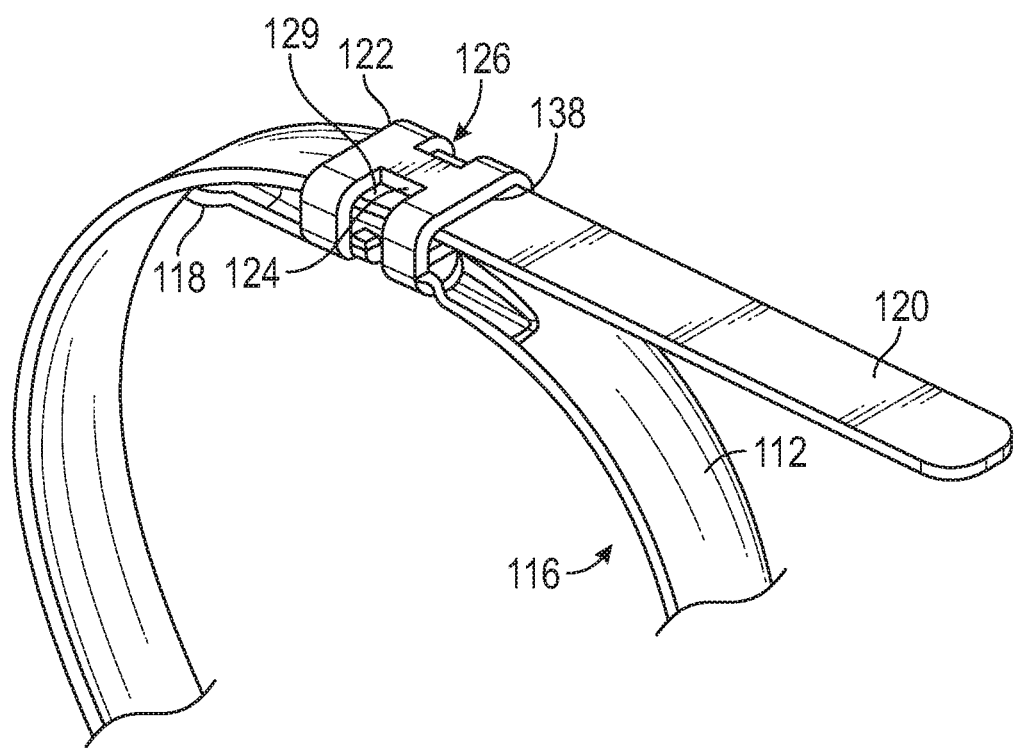
FIG. 15 is a partial perspective view of the band clamp clamped but not cut; and, FIG. 16 is a partial perspective view of the band clamp with the tab cut and removed.

The cinching handle 24 is coupled to a tensioning member 36 by a link 38. The link 38 is coupled to the handle 24 and tensioning member 36 by pins 40, 43 to allow for relative rotational motion between the components. The tensioning member is slidably coupled to the base member 28 by a pair of shafts 44 (FIG. 7). It should be appreciated that as the cinching handle 24 is rotated, the tensioning member 36 will slide along the shaft 44 relative to the base member 28. The tensioning member 36 includes a slot 46 that extends through the tensioning member 36 and is sized to receive a first pawl 48. The first pawl 48 is rotationally coupled to the tensioning member 36 by a pin 50. As will be discussed in more detail herein, the first pawl 48 cooperates with a second pawl 52 to pull the tab end of a band clamp through the tool 20 in response to the rotation of the handle 24. The second pawl 52 is rotationally coupled to the base member 28 by a pin 54. Both the first pawl 48 and second pawl 52 have a knurled or grooved surface 56, 58 that engages the tab end of the band clamp during the cinching operation. The pawls 42, 48 cooperate with the link 38 and handle 24 to define a tensioning means for tensioning the band clamp 112 (FIG. 15).

It should be appreciated that in some instances, the operator may desire to remove the band clamp 112 from the tool 20 after it has been inserted and the pawls 48, 52 are engaged. In an embodiment, the operator can release the tension on the band 120 by rotating the handle 24 in a counterclockwise motion, in other words in an opposite direction to motion of arrow 134. Once the tension is released and the pawls 48, 52 disengaged, the band clamp 112 can be removed from the tool 20.

The crimping handle 26 includes a slot 60 that is sized to receive a pin 62 that rotationally couples the crimping handle 26 to the base member 28. The crimping handle 26 is further rotationally coupled to a cam member 66. The cam member 66 includes a body portion 68 that slidably engages a slot 70 in the base member 28. The slot 70 constrains the motion of the cam member 64 to sliding linearly within the base member 28 in a direction that is generally perpendicular to the tab end portion of the band clamp 112.

The cam member 66 includes a surface 72 (FIG. 11) that includes an opening 74. The opening 74 has a bottom surface 76 having a hole 78 extending therethough. The opening 74 and hole 78 are sized to receive a fastener 80. As will be discussed in more detail below, the fastener 80 includes a head portion 82 that selectively engages the surface 76 during the cutting operation. The fastener 80 is coupled on an end opposite the head portion 82 to a cutter member 84.

The cutter member 84 includes a body portion 86 that slidably engages the slot 70. As with the cam member 66, the slot 70 constrains the motion of the cutter member 84 to a linear motion in a direction generally perpendicular to the tab end of the band clamp. The cutter member 84 further includes a slot 88 on one end that is arranged to receive the tab end portion of the band clamp when the band clamp is inserted into the tool 20 and the tool is in the neutral position. The slot 88 includes a cutting surface 90. As will be discussed in more detail herein, the cutter member 84 is laterally moved in the slot 70 by the head portion 82 of fastener 80 engaging the surface 76. This causes the cutting surface 90 to engage and sever or shear off the tab end portion of the band clamp during the cutting operation.

The cam member 66 further includes a cam portion 92 having a pair of opposing cam surfaces 94. In the exemplary embodiment, the cam portion 92 extends from the body portion 68 into an opening 96 (FIG. 2) in the base member 28. The cam portion 92 includes a pair of opposing slots 98 (FIG. 11) that extend generally parallel with the slot 70. In an embodiment, the slots 98 bifurcate the cam surfaces 94 and are sized to at least partially receive arms 100. The arms 100 are rotationally coupled to the base member 28 by a pin 102. On a first end of each the arm 100, a pair of bearings 104 are coupled on opposing faces. The bearings 104 are positioned to engage the cam surface 94 in response to movement of the cam member 66 within the slot 70. On an opposing end of each arm 100 a jaw 106 (FIG. 4) is provided that includes an end 108 and a relief portion 110. In the exemplary embodiment, the end 108 is a sharp edge that engages and partially pierces the band portion of the band clamp to crimp the band portion to a clip and secure the band clamp. The relief portion 110 is sized and shaped to form tabs or wings from the pieced band portion during the crimping operation.

Figure 6:
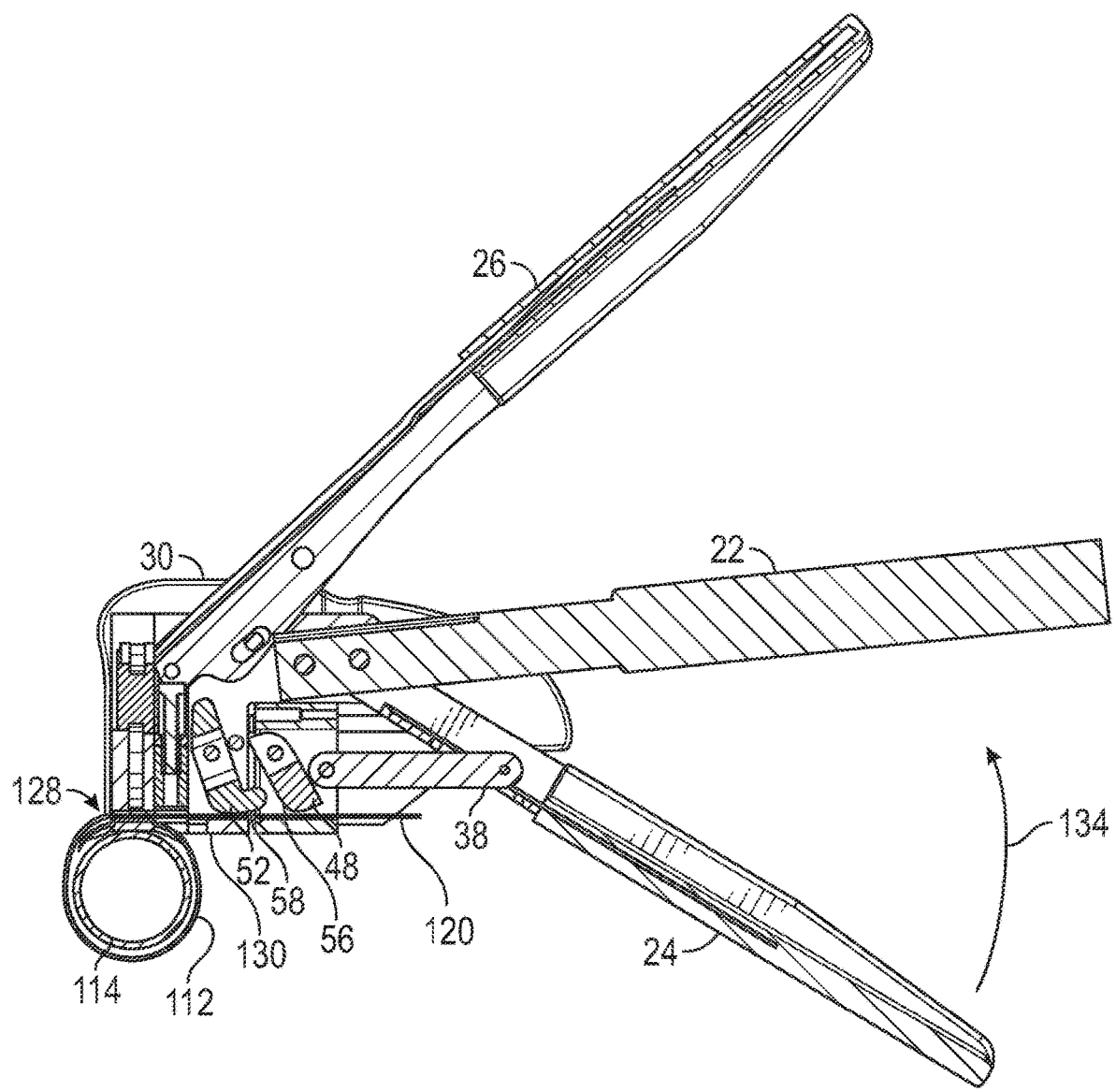
FIG. 6 is a side sectional view of the tool of FIG. 1 in a neutral position with a band clamp engaged.
Figure 16:
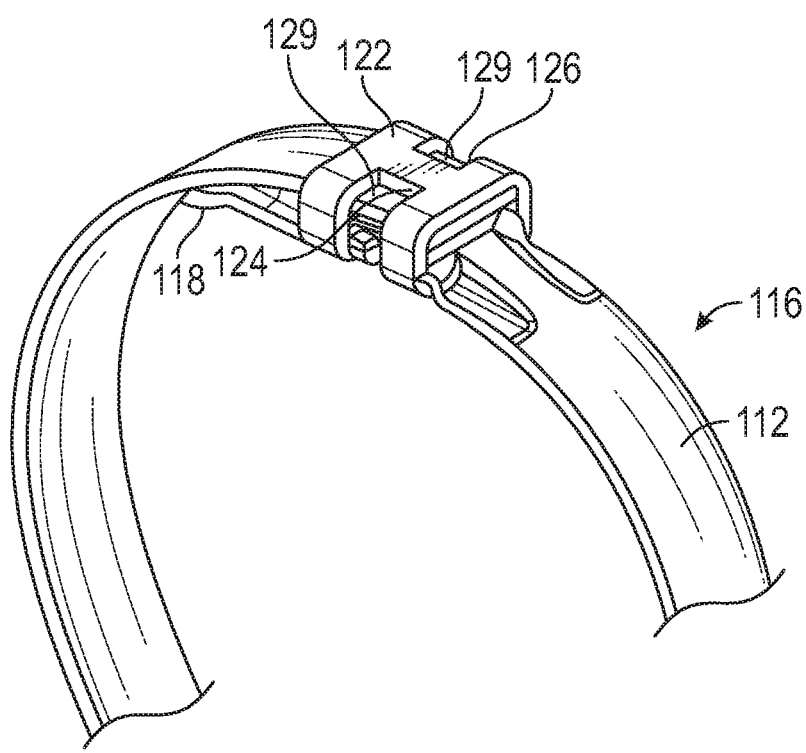

Referring now to FIG. 6, FIG. 15 and FIG. 16, at the initiation of operation, the user first installs a band clamp 112 about a conduit or pipe 114 where a connection is desired. Band clamp 112 is generally formed by a generally thin planar metal strip or band portion 116 that is formed into a loop where a first end 118 is overlapped by a tab end portion 120. In the exemplary embodiment, a buckle or clip 122 is inserted over the overlapped portion. The clip 122 includes a pair of slots 124, 126. The slots 124, 126 are sized to receive the jaws 106 of tool 20. When the jaws 106 engage the outer layer of the overlapped portion, the band portion 116 is deformed to form a deformed portion 128 within the slots 124, 126 to secure the clip 122. In some embodiments, the deformed portion 129 is sheared along the sides to form a wing or projection that extends into the slots 124, 126. In an embodiment, the band clamp 112 may be the band clamp described in commonly owned PCT Publication 2016/029975.

Figure 1:
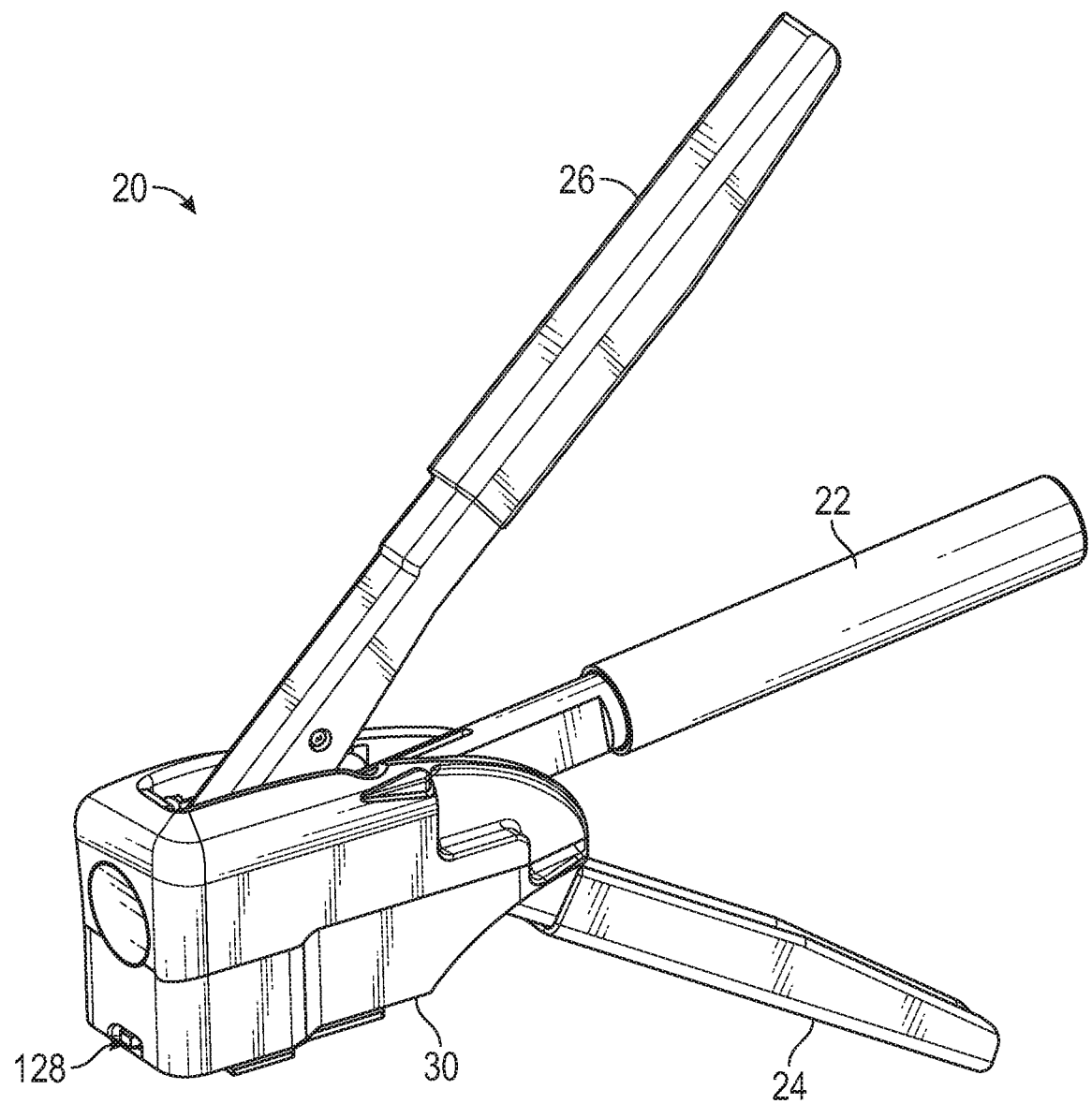
FIG. 1 is a perspective view of a tool for securing a clamp in a neutral position in accordance with an embodiment.
Figure 2:
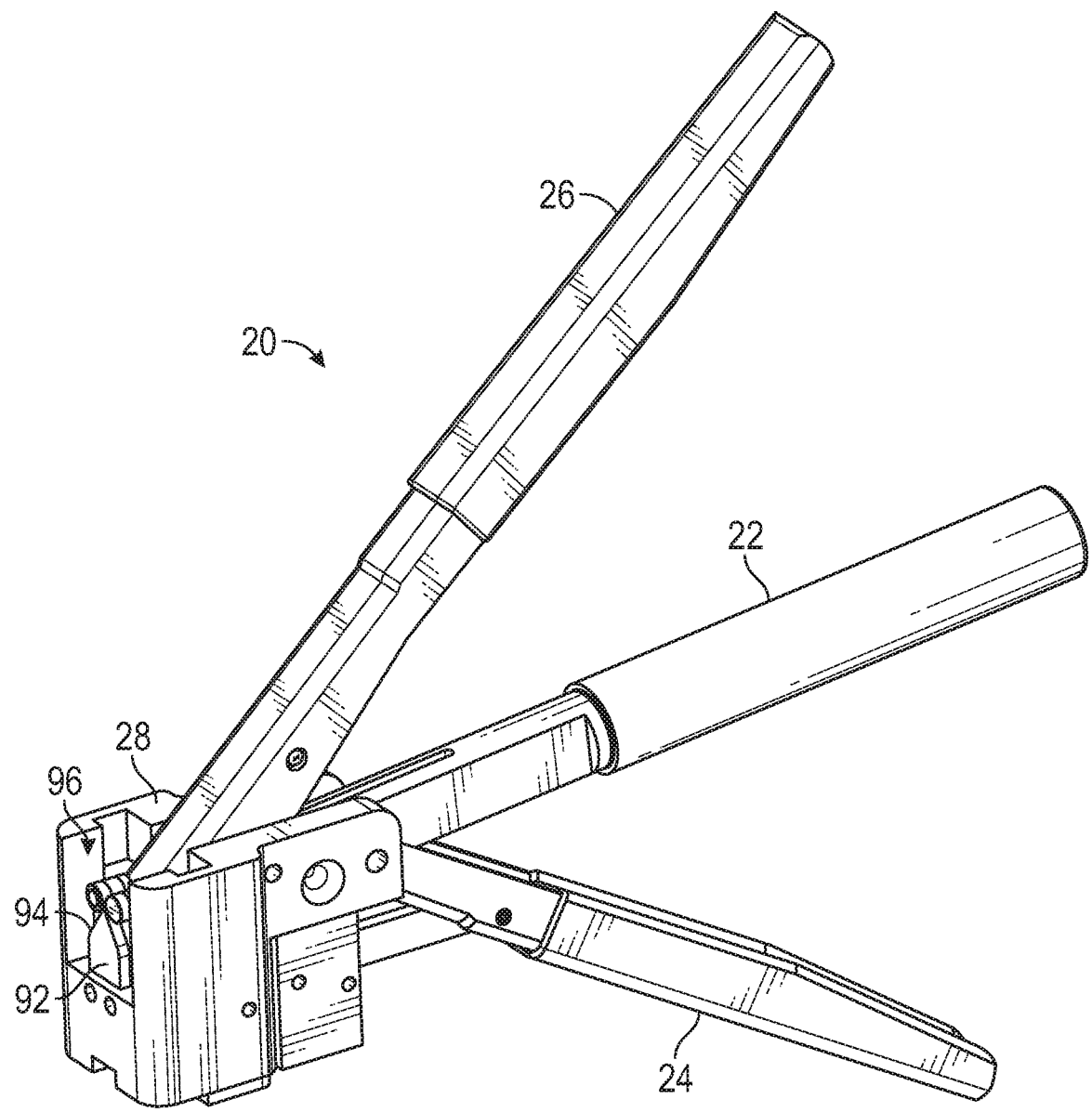
FIG. 2 is a perspective view of the tool of FIG. 1 with a cover removed.
Figure 3:
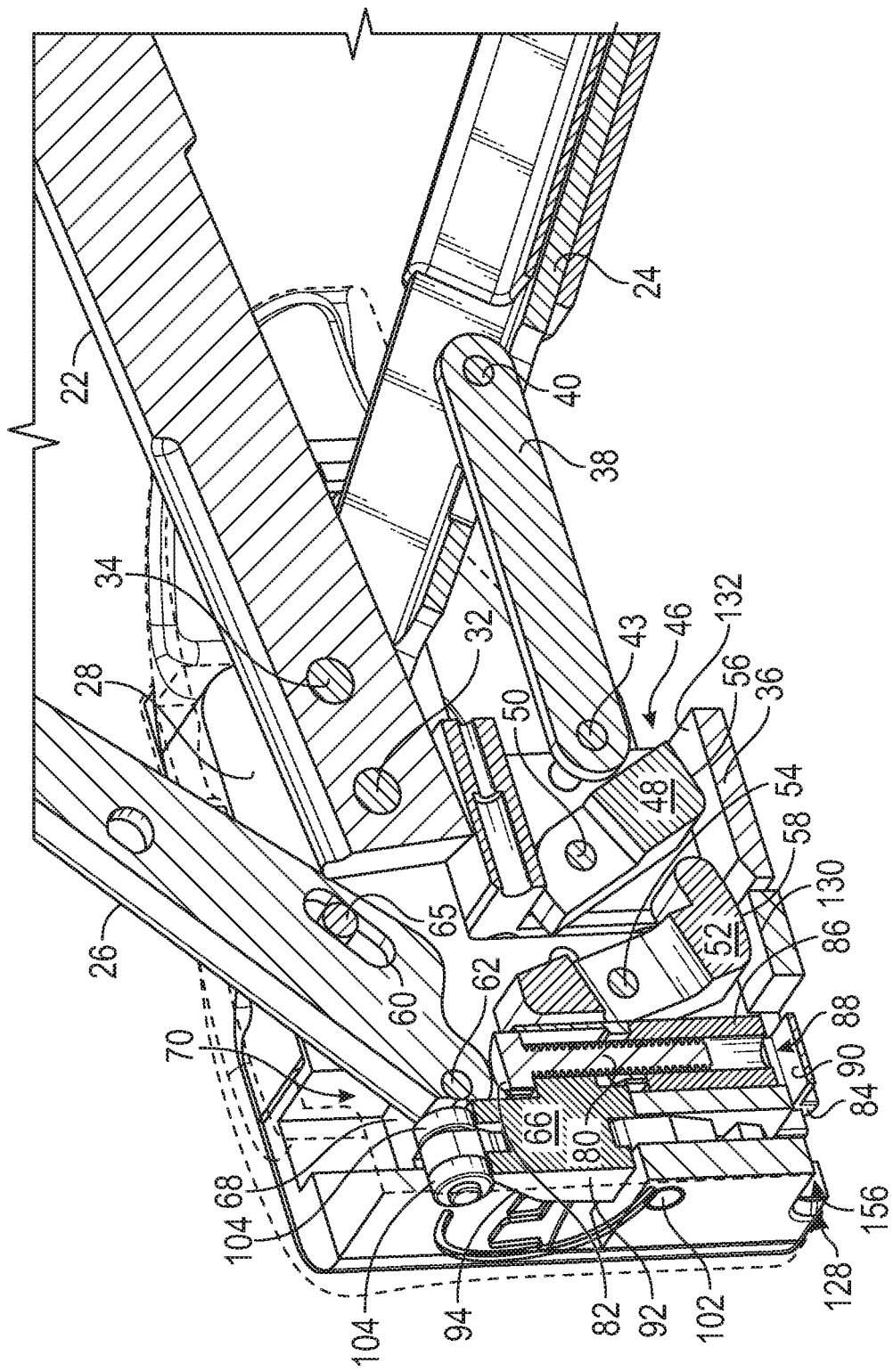
FIG. 3 is a partial sectional view of the tool of FIG. 1.
Figure 4:
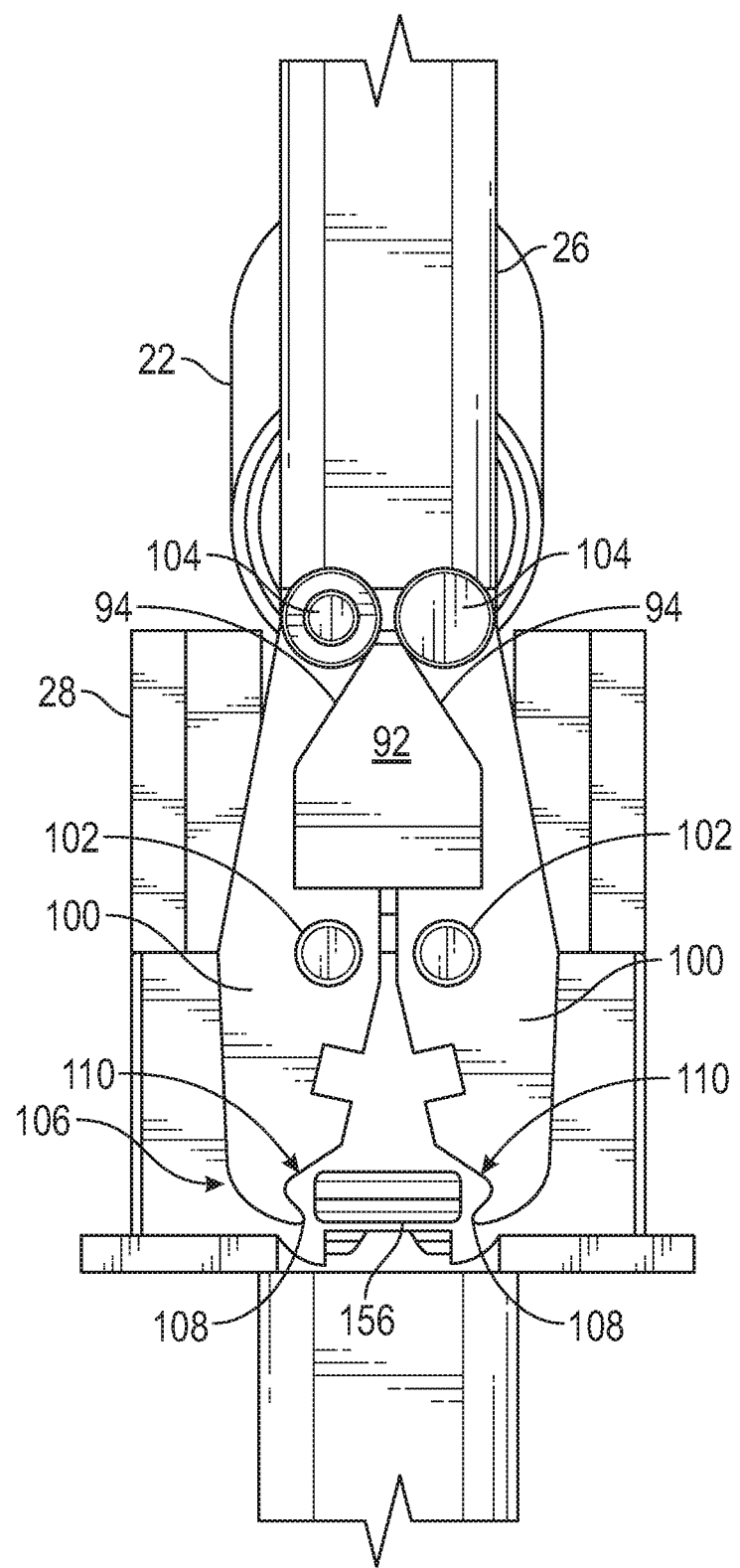
FIG. 4 is a partial front view of the tool of FIG. 1 with a cover and base frame member removed.
Figure 5:
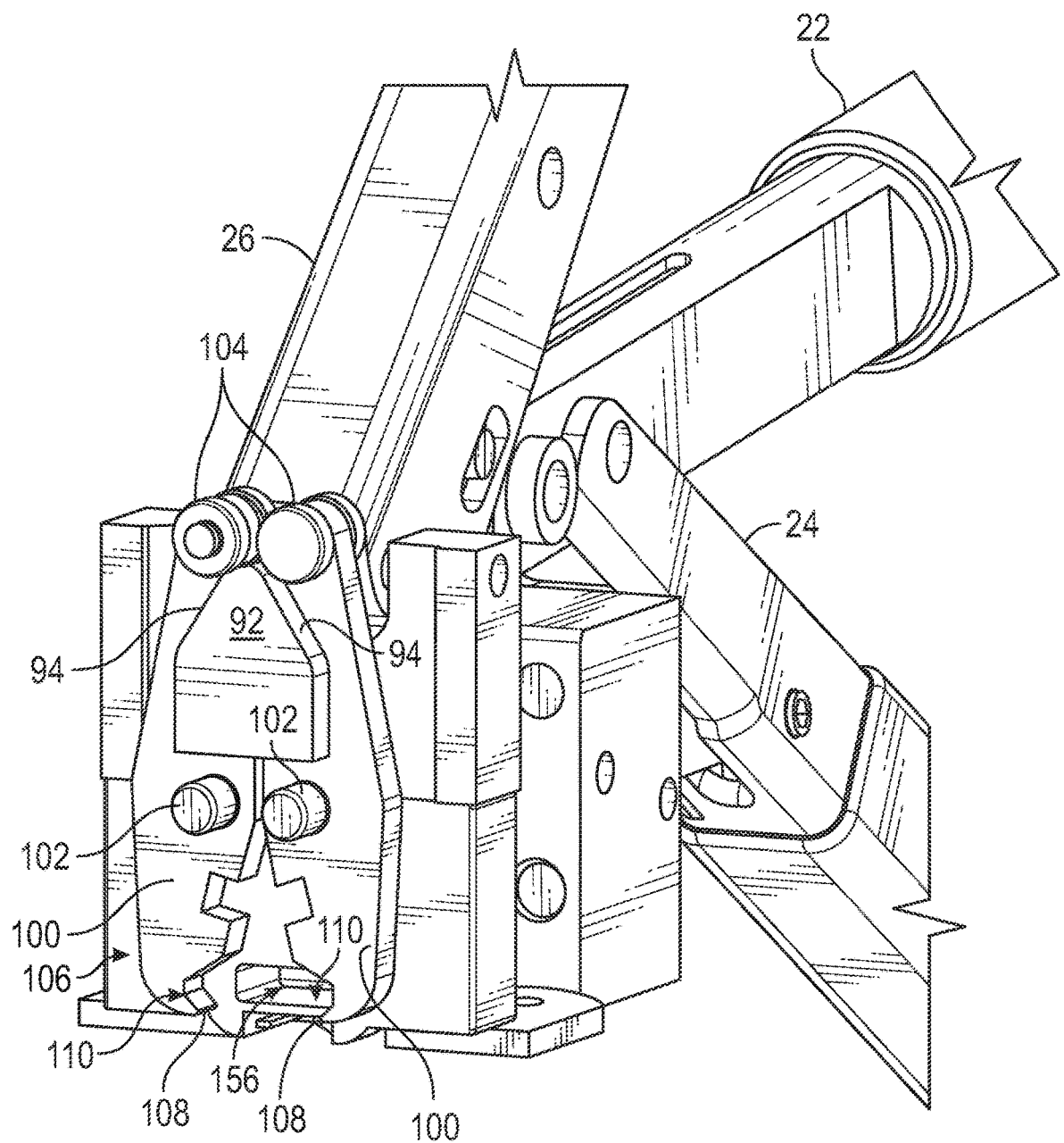
FIG. 5 is a partial perspective view of the tool of FIG. 1 with a cover and base frame member removed.

To engage the band clamp 112, the user moves the tool 20 to the neutral position (FIG. 6) and inserts the tab end portion 120 through a slot 128 (FIG. 1) in the cover 30 and slot 88 in cutter member 84. As shown in FIG. 3, as the tab end portion 120 continues to be inserted with the tab end portion 120 passing between the pawl surface 58 and a bottom cap member 130 as well as between the pawl surface 56 and a surface 132 of tensioning member 36. The end of tab end portion 120 may extend out the rear side of the cover 30. It should be appreciated that the pawl surfaces 56, 58 engage the top surface of the tab end portion 120. The band clamp 112 is continued to be inserted until the clip 122 is positioned adjacent jaws 106.

Figure 8:
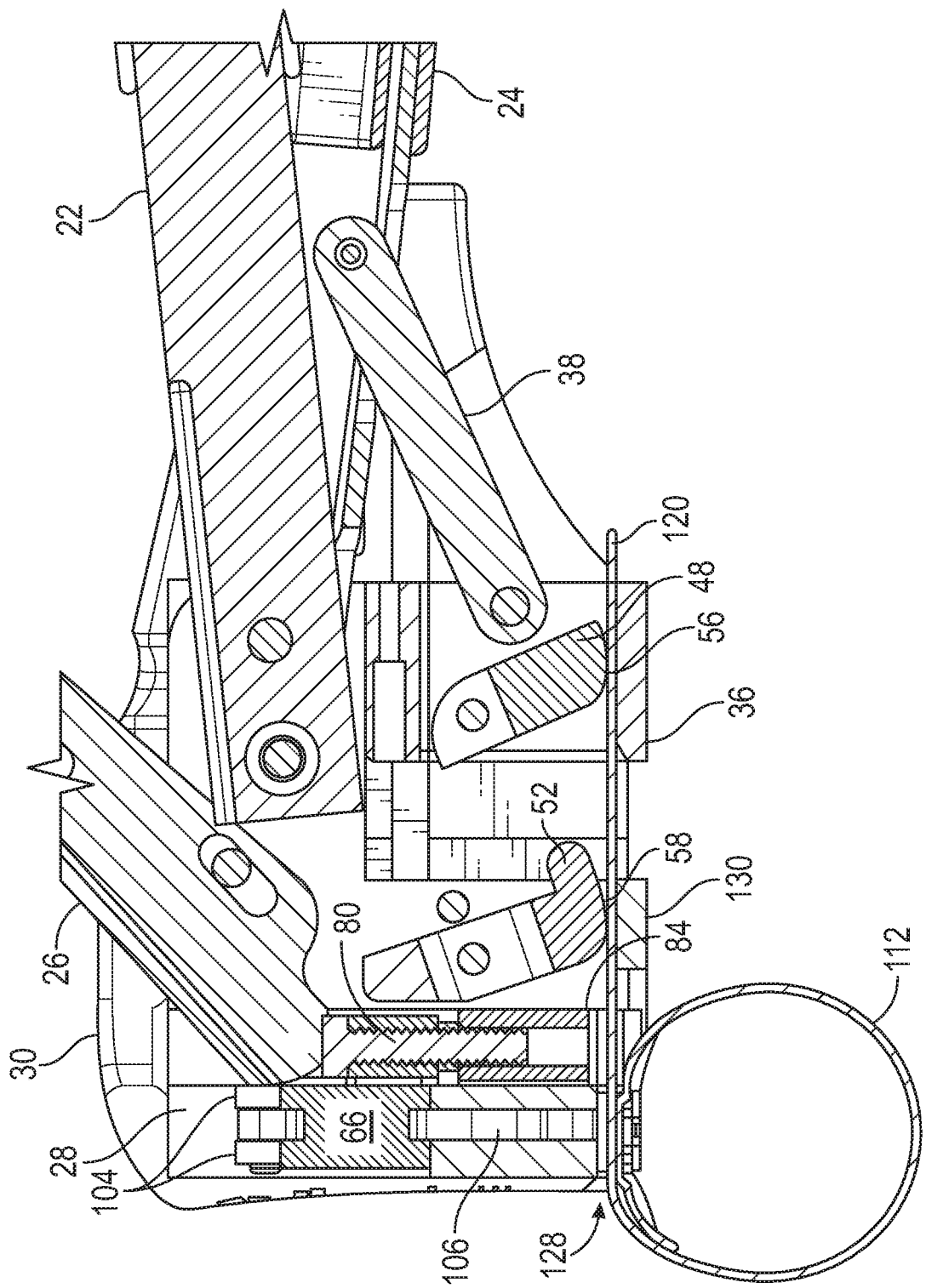
FIG. 8 are an enlarged partial side sectional views of the tool of FIG. 7 in the cinching position.

Referring to FIGS. 7-8 with continuing reference to FIG. 6, to tighten the band clamp 112 about the conduit 114, user operates the tool 20 in a cinching mode of operation. In the cinching mode, the cinching handle 24 is moved by the user from a first position (FIG. 6) to a second position (FIG. 7) in the direction of arrow 134. As the handle 24 is moved, the tensioning member 36 moves from a first position (FIG. 6) to an extended position (FIG. 7) by sliding along the shafts 44. Due to the engagement of the pawl surface 56 with the top surface of the tab end portion 120, the tab end portion 120 is fixed relative to the tensioning member 36. It should be appreciated that as the tensioning member is moved to the second position, the tab end portion 120 is pulled through the clip 122 causing the band clamp 112 to tighten around the conduit 114.

When the movement direction of the handle 24 is reversed, the tensioning member 36 moves in a direction towards the jaws 106. As the tensioning member 36 is moved, the pawl 48 rotates allowing the tensioning member 36 to move relative to the tab end portion 120. It should be appreciated that the pawl 52 remains in position to prevent or limit the movement of the tab end portion 120 toward the front of the tool. Thus by repeated moving the handle 24 between the positions of FIG. 6 and FIG. 7, the tab end portion 120 will be progressively moved causing the band clamp 112 to tighten on the conduit 114.

Figure 9:
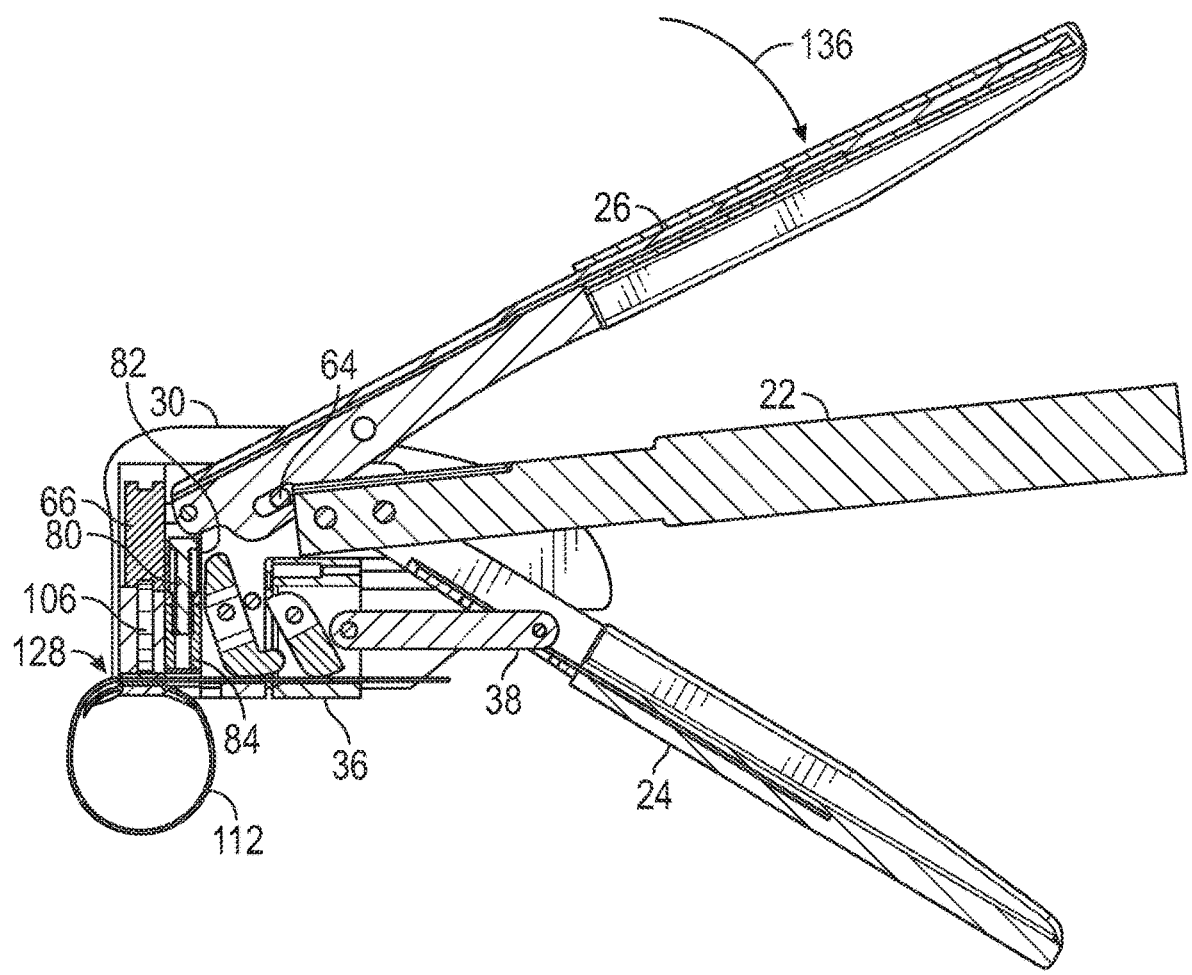
FIG. 9 is a side sectional view of the tool of FIG. 1 with the tool in a crimping position with the band clamp engaged.
Figure 10:
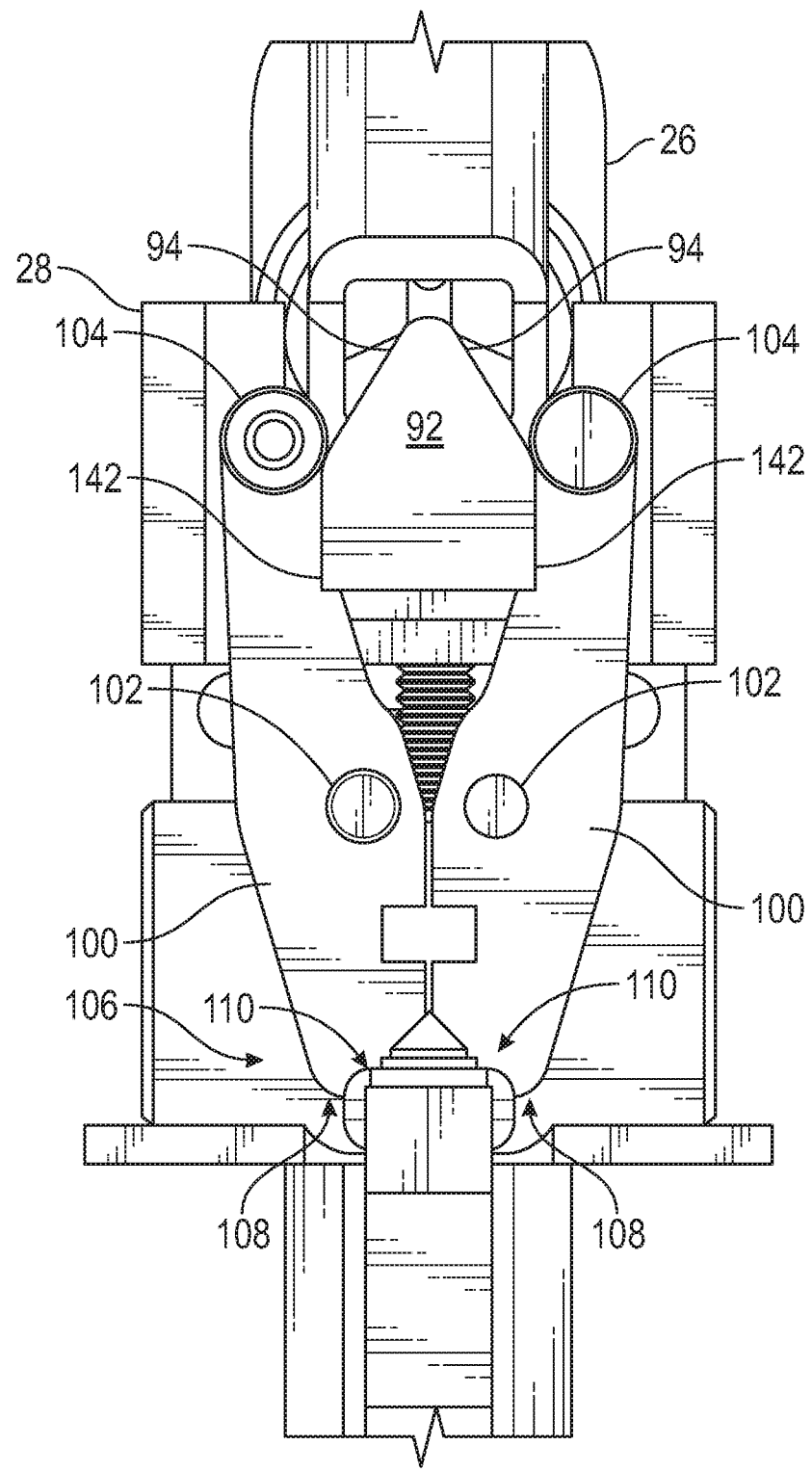
FIG. 10 is a partial front view of the tool of FIG. 9 with the tool in the crimping position and the cover and base member removed.

When the band clamp 112 has been tightened to the desired level, the operator then deforms or crimps the portion 129 of the band clamp 112 to secure the clip 122 to the band clamp. To perform this action, the operator moves the crimping handle 26 in the direction indicated by arrow 136. As shown in FIGS. 9-11, the movement of the handle 26 causes the handle 26 to pivot about the pin 65. This rotation causes the cam member 66 to move laterally in a direction away from band clamp 112. As the cam member 66 moves, the cam surface 94 of portion 92 engages the bearings 104. As the cam member 66 continues to move, the angle of the cam surface 94 places a force on the bearings 104 that causes the arms 100 to rotate about the pin 102.

The rotation of the arms 100 in turn causes the end 108 to pass into the slots 124, 126 (FIG. 15) to engage the outer layer of the overlapping portion of the band clamp 112. As the arms 100 continue to rotate, the band clamp is crimped and the deformed portion 129 contacts and couples to the clip 122. In an embodiment, the relief portion 110 is shaped to provide the desired shape of the deformed portion 129. In an embodiment, the handle 26, cam member 66, bearings and arms 100 cooperate with the slots 156 to provide a means for locking or crimping the clip 122.

It should be noted that when the crimp is performed, a gap remains between the surface 76 of the cam member 84 and the head portion 82 of fastener 80. Therefore, as the crimp is being formed, the cutter member 84 remains in the same position.

Once the crimp is performed, it may be desired to remove the tab end portion 120 adjacent an end 138 (FIG. 15) of the clip 122. As shown in FIGS. 12-14, in an embodiment, the operator may continue to move the handle 26 in the direction indicated by arrow 140 to the cutting position shown in FIG. 12. This movement of the handle 26 causes the cam member 84 to continue to move away from the band clamp 112. As the handle 26 is moved from the position of FIG. 9 to the position of FIG. 12, the bearings 104 move from the cam surface 94 to a planar surface 142 (FIG. 10). The surface 142 is generally parallel with the direction of movement of the cam member 84. As a result, the jaws 106 remain in the same position (i.e. substantially no further crimping is performed).

However, the continued movement of the cam member 84 causes the gap 152 (FIG. 11) between the bottom of the head portion 82 and the surface 76 to close. As the cam member 84 continues to move, the fastener 80 will also move. Since the fastener 80 is coupled to the cutter member 84, the cutter member 84 will also move in the same direction. This causes surface 90 to engage and apply a force on the surface of the tab end portion 120 directly adjacent the clip 22. Since the clip 122 is held in position by walls 144, 146, the force applied by the surface 90 will displace the section 148 of the tab end portion 120 relative to the portion 150 located within the clip 122. As a result, the tab end portion 120 will be sheared or severed from the band clamp 112. In one embodiment, the walls 144, 146 each include a slot 156 (FIG. 5) that is sized and shaped to receive the clip 122. In an embodiment, the slots 156 in walls 144, 146 define a means for holding the clip 122 in the tool 20. The slots 156 further cooperate with the cutter member 84 to provide a means for severing the tab end portion 120 from the band clamp 112 of FIG. 13.

Once the tab end portion 120 is separated from the band clamp 112, the handle 26 may be rotated back to the position of FIG. 6. This pivots the jaws 106 away from the clip 122 and moves the cutter member 84 to its original position where the slot 88 is aligned with the slot 156. This allows the tab end portion 120 to be removed from the rear portion of the tool 20. Similarly, the tool 20 can be removed from the band clamp 112 by sliding the clip 122 out of the slots 156, 128 to provide a band clamp 112 such as that illustrated in FIG. 16. In an embodiment, the tab end portion 130 can also be removed by activating handle 24.

In some embodiments, the description of the tool may have included relative references to the "top", "bottom", "front", and "rear". It should be appreciated that this was for clarity of description and not intended to limit the use or orientation of the tool 20 in a particular manner and the claims should not be so construed. As used herein, the "bottom" generally refers to the side of the tool 20 adjacent the band clamp 112 and the "top" is the opposing side that the handle 26 extends from. The "front" of the tool 20 generally refers to the side adjacent the arms 100, while the "rear" of the tool 20 refers to the side which the handles 22, 24 extend from.

It should be appreciated that the tool 20 provides advantages in allowing an operator to tighten/cinch, crimp and cut the band clamp 112 with a single tool.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A tool for securing a clamp having a band and a clip, a portion of the band extending through the clip, the tool comprising:
    a base member;
    a first handle coupled to the base member;
    a cinching handle rotationally coupled to the base member adjacent the first handle;
    a crimping handle rotationally coupled to the base member adjacent the first handle opposite the cinching handle;
    a holding means for holding the clip;
    a tensioning means is provided for moving a tab end portion of the band through the clip, the tensioning means being operably coupled to the cinching handle;
    a crimping means for locking the clip to the band, the crimping means being operably coupled to the crimping handle; and
    a severing means for severing the tab end portion from the band, the severing means being operably coupled to the crimping handle.

2. The tool of claim 1, wherein the tensioning means includes:
    a first pawl rotationally coupled to the base member;
    a tensioning member slidably coupled to the base member and operably coupled to the cinching handle; and
    a second pawl rotationally coupled to the tensioning member.

3. The tool of claim 1, wherein the crimping means includes:
    a cam member slidably coupled to the base member and operably coupled to the crimping handle, the cam member having at least one cam surface disposed on an angle relative to a sliding direction of the cam member;
    a pair of arms rotationally coupled to the base member, each of the pair of arms having at least one bearing coupled to one end and a jaw at an opposite end; and
    wherein the at least one bearing is arranged to engage the at least one cam surface and rotate the pair of arms from a neutral position to a crimped position, the jaws engaging the band in the crimped position.

4. The tool of claim 3, wherein the jaws are configured to engage the clip when the pair of arms are rotated from the neutral position to the crimped position.

5. The tool of claim 4, wherein the severing means includes:
    a cutter member slidably coupled to the base member, the cutter member having a slot on a first end, the slot being positioned to receive the tab end portion; and
    wherein the cam member is selectively coupled to move the cutter member based at least in part on a position of the crimping handle.

6. The tool of claim 5, wherein the cam member includes an opening with a surface and a hole extending through the surface, the opening being aligned with the cutter member.

7. The tool of claim 6, further comprising a fastener having a head portion, the fastener being coupled on one end to the cutter member, the head portion being disposed in the opening, wherein the head portion is offset from the surface when the crimping handle is moved from the neutral position to the crimped position.

8. The tool of claim 7, wherein the surface engages the head portion when the crimping handle is moved from the crimped position to a cutting position.

9. The tool of claim 8, wherein the cutter member moves in the sliding direction when the crimping handle is moved from the crimped position to the cutting position, and the tab end portion is severed from the band based at least in part on the movement of the cutter member.

10. A tool comprising:
    a base member having a first slot and a second slot, the second slot being perpendicular to the first slot and being sized and shaped to receive a clip from a band clamp;
    a first handle coupled to the base member;
    a cinching handle rotationally coupled to the base member adjacent the first handle;
    a crimping handle rotationally coupled to the base member adjacent the first handle opposite the cinching handle;
    a tensioning member slidably coupled to the base member and coupled to the cinching handle by a link;
    at least one pawl is rotationally coupled to the tensioning member, the at least one pawl cooperating with a surface of the tensioning member to engage a tab end portion of a band of the band clamp;
    a cam member is slidably disposed in the first slot and operably coupled to the crimping handle, the cam member having a pair of opposing cam surfaces arranged on an angle to the first slot;
    a pair of arms rotationally coupled to the base member, each of the pair of arms having a jaw portion at one end;
    a pair of bearings each coupled to one of the pair of arms on an end opposite the jaw portion, the pair of bearings each being arranged to engage one of the pair of opposing cam surface to rotate the pair of arms from a first position to a second position as the crimping handle is moved from a neutral position to a crimped position; and
    a cutting member slidably disposed in the first slot, the cutting member being selectively coupled to the cam member based on a position of the crimping handle.

11. The tool of claim 10, wherein the cutting member includes a third slot, the third slot being aligned with the second slot when the crimping handle is in the neutral position and the crimped position.

12. The tool of claim 11, wherein the cutting member moves from a third position to a fourth position based at least in part on a movement of the crimping handle from the crimped position to a cutting position, the second slot being offset from a plane of the third slot when in the fourth position.

13. The tool of claim 12, wherein the fourth position is offset a predetermined distance.

14. The tool of claim 12, further comprising a fastener coupling the cam member to the cutting member.

15. The tool of claim 14, wherein the cam member includes a body portion having an opening with a surface, the surface having a hole extending therethrough.

16. The tool of claim 15, within the fastener includes a head portion disposed in the opening, the head portion being offset from the surface when the crimping handle is in the neutral position and the crimped positions, the head portion being in contact with the surface when the crimping handle is moved from the crimped position to the cutting position.

17. The tool of claim 16, wherein the cam member further includes a pair of opposing second surfaces extending, each one extending from one of the pair of opposing cam surfaces.

18. The tool of claim 17, wherein the pair of bearings move onto the pair of second surfaces when the crimping handle is moved from the crimped position to the cutting position.

19. The tool of claim 18, wherein the pair of second surfaces are parallel to the first slot.

\* \* \* \* \*